(12) United States Patent
Lin

(10) Patent No.: US 8,459,468 B2
(45) Date of Patent: Jun. 11, 2013

(54) VACUUM MUG SEPARABLE CAP

(76) Inventor: Shin-Shuoh Lin, Laguna Hills, CA (US)

(*) Notice: Subject to any disclaimer, the term of this patent is extended or adjusted under 35 U.S.C. 154(b) by 185 days.

(21) Appl. No.: 13/135,586

(22) Filed: Jul. 11, 2011

(65) Prior Publication Data

US 2012/0074143 A1    Mar. 29, 2012

(51) Int. Cl.
*B01D 35/02* (2006.01)
*A47J 31/06* (2006.01)

(52) U.S. Cl.
USPC . 210/464; 210/469; 222/189.06; 222/189.07; 99/323

(58) Field of Classification Search
None
See application file for complete search history.

(56) References Cited

U.S. PATENT DOCUMENTS

| | | | |
|---|---|---|---|
| 5,918,761 A | 7/1999 | Wissinger | |
| 6,273,306 B1 | 8/2001 | Takagawa | |
| 6,468,332 B2 | 10/2002 | Goglio | |
| 6,505,752 B1 | 1/2003 | Rolfes et al. | |
| 6,659,302 B2 | 12/2003 | Lin | |
| 6,752,287 B1 | 6/2004 | Lin | |
| 7,735,698 B2 | 6/2010 | Lin | |
| 7,806,044 B2 | 10/2010 | Lin | |
| 2006/0255035 A1* | 11/2006 | Lin | 220/212 |

* cited by examiner

*Primary Examiner* — Benjamin Kurtz
(74) *Attorney, Agent, or Firm* — Gordon K. Anderson

(57) ABSTRACT

A separable cap (10) for a vacuum mug is taught which consists of a removable lid (20) having a graspable shaped outwardly extending lip (22) and a stopper body (34), having a bottom portion (36) which includes a central orifice (38). The removable lid is attached to the stopper body and a resilient diaphragm plug (56) is compressed between the lid and the stopper body. A stopper mug seal (68) is attached to the stopper body providing a liquid tight seal between the cap and the vacuum mug. A beverage filter (72) is removeably attached to the stopper body bottom portion permitting a beverage a media to be placed into the vacuum mug and hot water poured over the media, after steeping, a brewed beverage is formed. When the lid is removed the compressed diaphragm plug is released and returns to its original dished shape permitting the beverage to be sipped from the stopper body and the media residue strained with the filter.

15 Claims, 5 Drawing Sheets

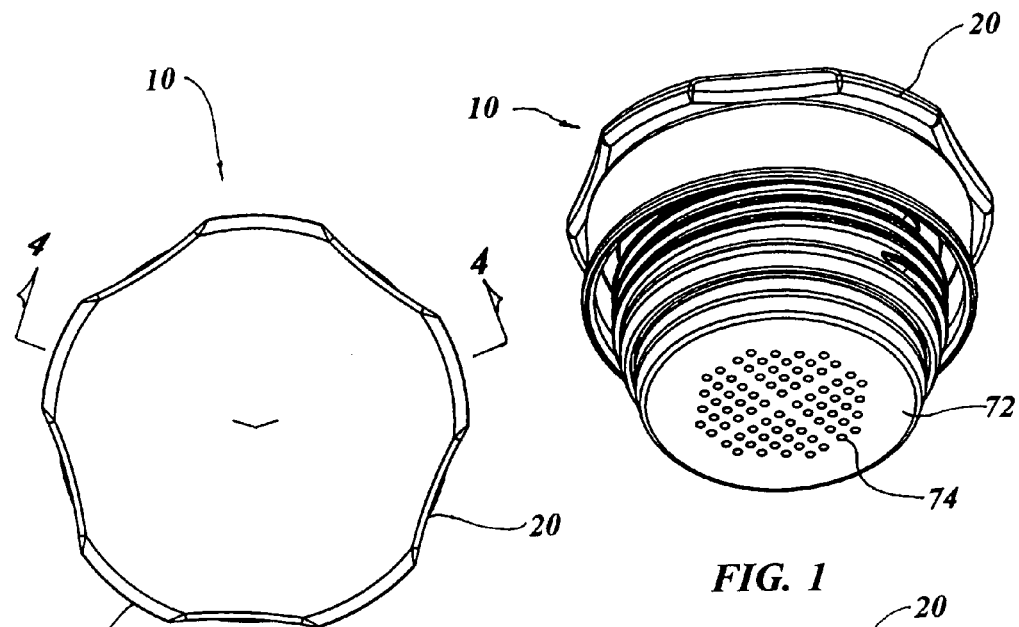
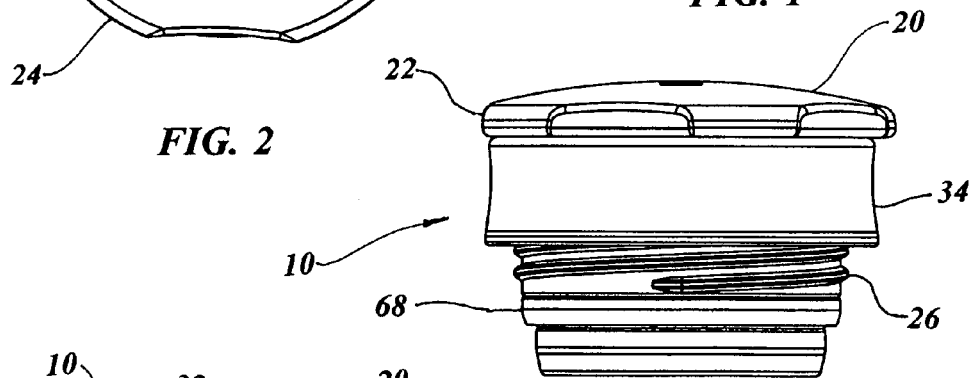
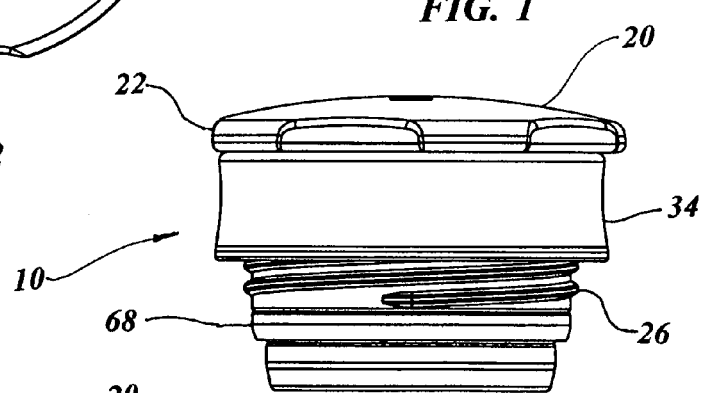
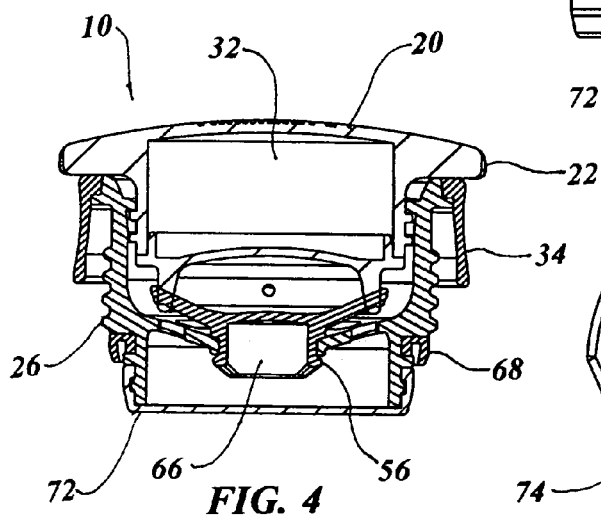
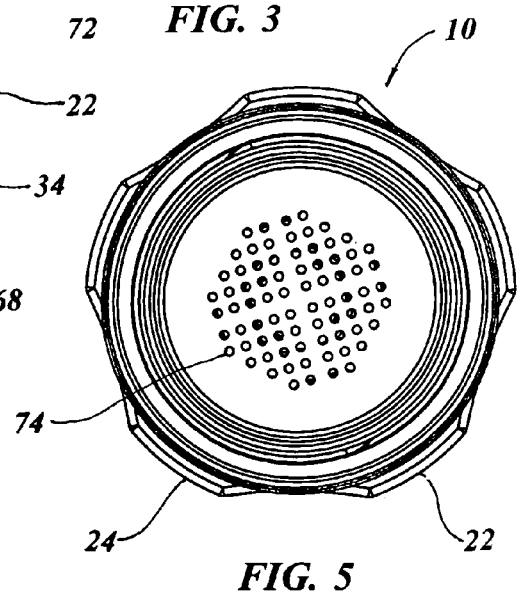
FIG. 1
FIG. 2
FIG. 3
FIG. 4
FIG. 5

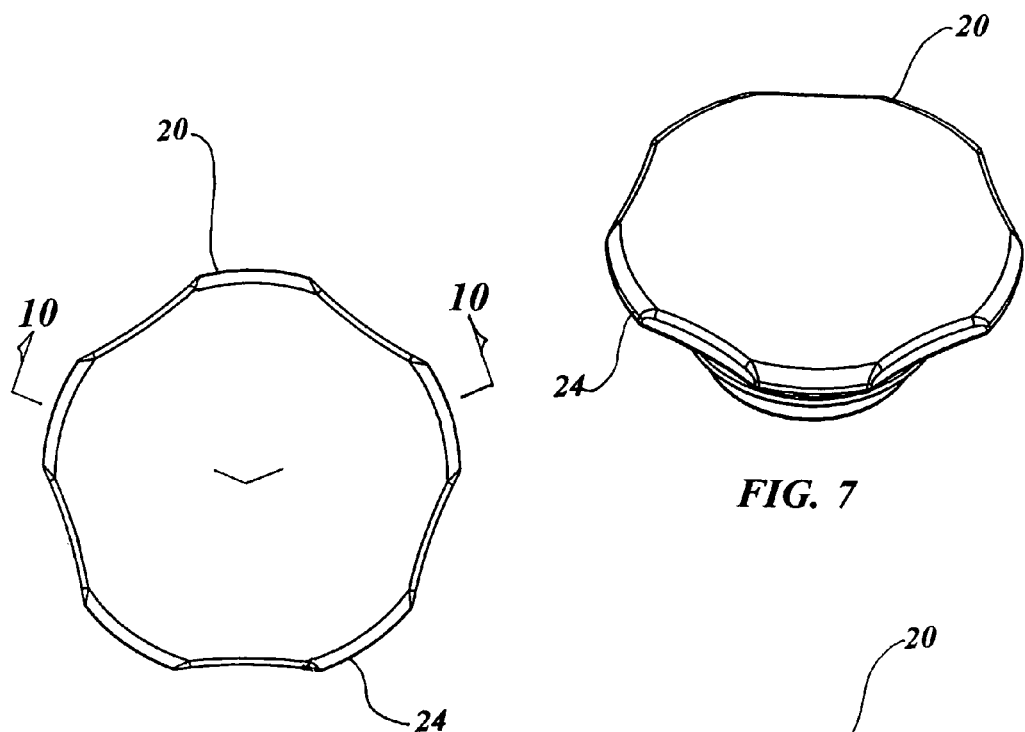
FIG. 7
FIG. 8
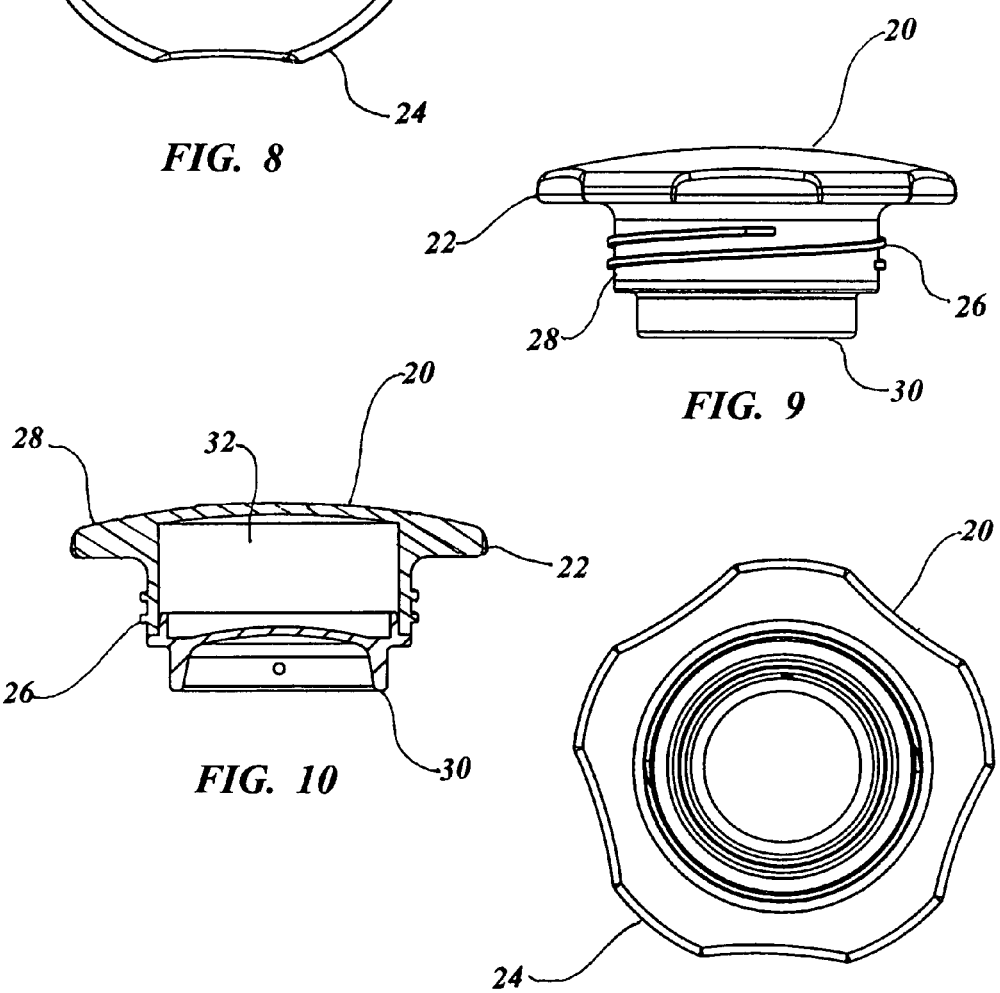
FIG. 9
FIG. 10
FIG. 11

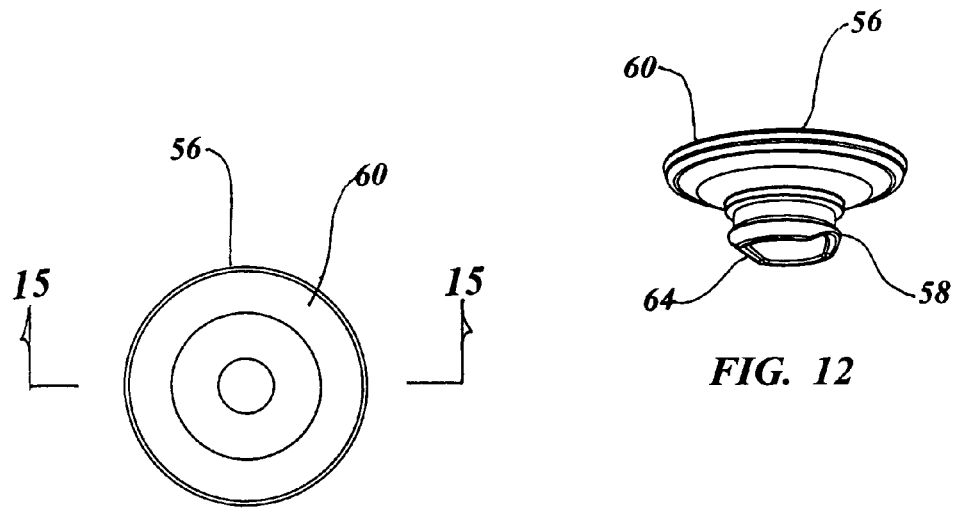
FIG. 12
FIG. 13
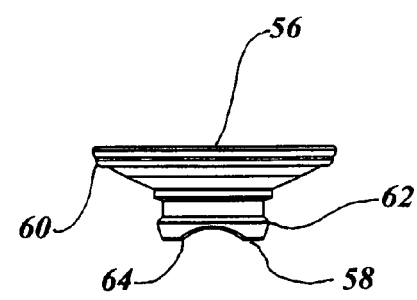
FIG. 14
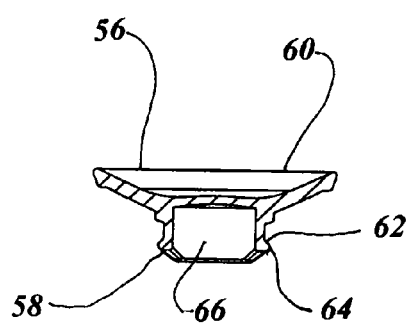
FIG. 15
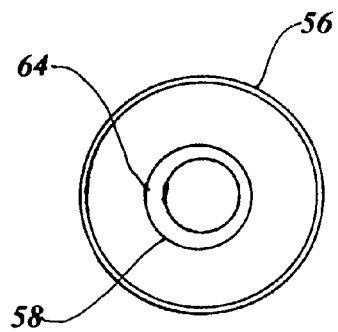
FIG. 16

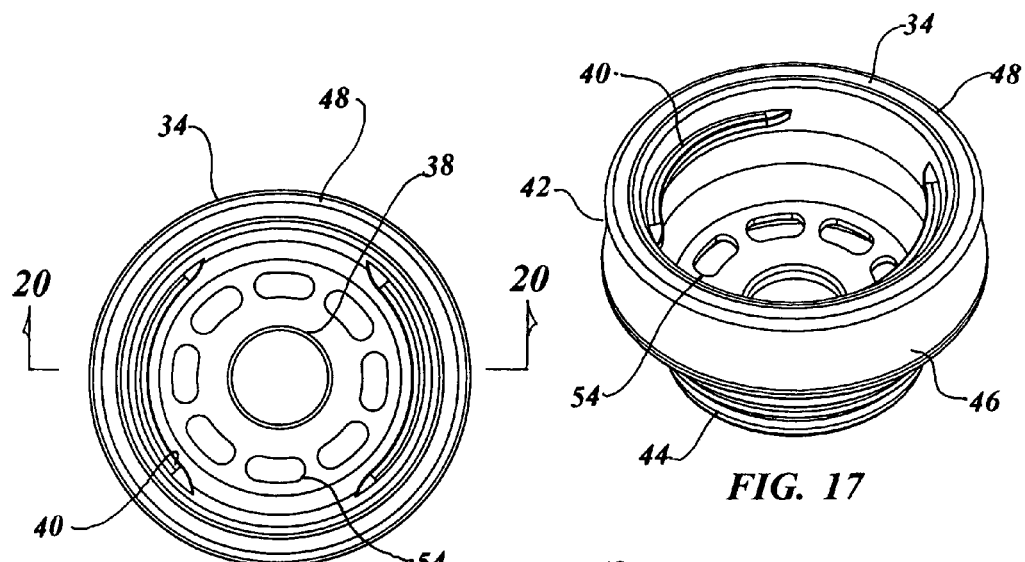
FIG. 17
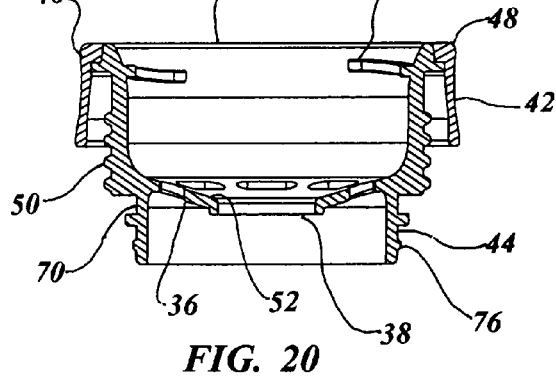
FIG. 18
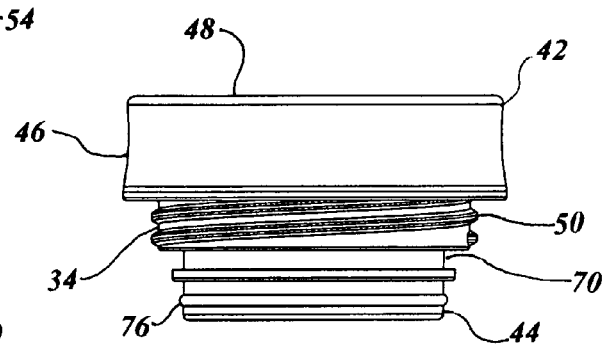
FIG. 19
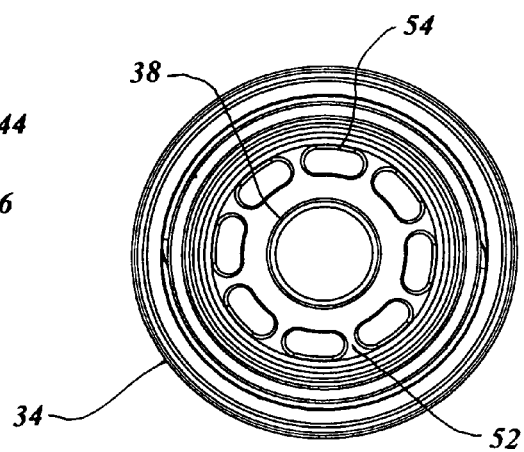
FIG. 20
FIG. 21

VACUUM MUG SEPARABLE CAP

TECHNICAL FIELD

The present invention relates to caps in general. More specifically to a lid having two separate parts, a removable lid for sealing the container and smooth edged stopper for sipping a beverage within the container after the lid is removed.

BACKGROUND ART

Previously, many types of caps or lids have been used in endeavoring to provide an effective means to enclose and seal a vacuum container and still permit removal of a liquid within when desired.

The prior art listed below did not disclose patents that possess any of the novelty of the instant invention; however the following U.S. patents are considered related:

| Pat. No. | Inventor | Issue Date |
| --- | --- | --- |
| 5,918,761 | Wessinger | Jul. 6, 1999 |
| 6,273,306 B1 | Takagawa | Aug. 14, 2001 |
| 6,468,332 B2 | Goglio et al. | Oct. 22, 2002 |
| 6,505,752 B2 | Rolfes et al. | Jan. 14, 2003 |
| 6,659,302 B2 | Lin | Dec. 9, 2003 |
| 6,752,287 B1 | Lin | Jun. 22, 2004 |
| 7,735,698 B2 | Lin | Jun. 15, 2010 |
| 7,806,044 B2 | Lin | Oct. 5, 2010 |

Wessinger in U.S. Pat. No. 5,918,761 teaches a double wall insulated container with a removable cover mounted on the container having a sealing surface in sealing engagement with a second surface on a sealing ring.

U.S. Pat. No. 6,273,306 B1 issued to Takagawa relates to a lid for a liquid container appropriate for pouring drinks like coffee. The container contains a pouring spout extending from the container with a perforated portion to deter the entry of trash while allowing the liquid to pour smoothly. The lid is hinged to the container upper portion.

Goglio et al. in U.S. Pat. No. 6,468,332 B2 discloses a one-way degassing valve for containers of aromatic products, such as coffee etc. which comprises a valve body, a valve element and a filter including a selective filter layer, preferably of activated charcoal allowing the passage of low molecular weight gasses such as carbon dioxide while retaining high molecular weight gasses that constitute the product's aroma. An oxygen and $CO_2$ absorbing layer eliminates the residual oxygen present within the container and suitably reduces the amount of $CO_2$.

Rolfes et al. in U.S. Pat. No. 6,505,752 B2 teaches a coffee server having a hinged lid. An offset brew path is provided through the stopper which includes the hinged cover removably attached to the pour spout neck with the cover pivoted to permit coffee from a brewer to enter the server through an offset portion of the stopper during the refilling process.

U.S. Pat. No. 6,659,302 B2 issued to Lin is for a leak proof coffee mug lid utilizing a lid body with an aperture the middle, which includes valve positioning indexing shoulders. The body has a number of outlet ports for dispensing coffee or liquid. A valve guide plate is disposed within the aperture which includes an upwardly protruding push ring and a gasketed valve plate that is slideably positioned within the push ring. When the twist knob is rotatably reversed, the valve plate returns to it's at rest position, under spring compression, securing the liquid in a leak proof manner.

Lin in U.S. Pat. No. 7,735,698 B2 discloses a vacuum insulated no-drip carafe with a lid. The lid engages the top of the bottle and incorporates a pouring spout with a liquid cavity running through into the interior of the carafe. The lid includes an attached handle having a spring loaded lever that pivotally snaps into the lid. The lever has an integral downwardly projecting plug finger that engages the liquid cavity when at rest. When compressed, the finger is pivoted away from the cavity permitting a beverage to flow freely until manually released.

For background purposes and as indicative of the art to which the invention is related reference may be made to the remaining cited U.S. patents issued to Lin in U.S. Pat. No. 6,752,287 B1 and No. 7,806,044 B2 also of Lin.

DISCLOSURE OF THE INVENTION

A primary object of the invention is that the cap functions not only as a stopper but also as a sipper lid for a brewed beverage. This object is accomplished by using two separate discrete components, first a stopper body that threads into the open top of a vessel, such as a vacuum mug, and functions in this embodiment as an open top sipper permitting the brewed beverage to flow freely from the vessel and is easily sipped from a radial edge of the top of the stopper body. The stopper body configuration and filtering capabilities permit a beverage a media such as prepared coffee or tea, or the like, to be placed first in the vessel with hot water poured over the media. After the media steeps, the desired time, a brewed beverage is formed and may be sipped from the mug immediately, or secondly, the lid may be screwed in place in the stopper body for later consumption where the invention is then only utilized as a stopper.

The dual purpose utility using the cap only as a stopper is accomplished by simply adding the cap to the stopper body which depresses a diaphragm plug to cover openings between the cap and body. When the lid is removed the compressed diaphragm plug is released and returns to its original at rest dished shape permitting the beverage to be sipped from the stopper. A filter is removeably attached to the bottom of the stopper body permitting the beverage to retain only the desired liquid with the media residue held back by the filter.

An important object of the invention is that there are no adjustments necessary when changing from the stopper function to a sipper function as only the removal of the lid from the body allows the change to be made which is the completely automatic and intuitively obvious in purpose.

Another object of the invention is the ease of disassembly for cleaning. There are only five components in the entire cap assembly and each component may be removed and cleaned separately by hand or placed in a dishwasher. Reassembly is obvious and easily accomplished.

Still another object is directed to its universal utility, as the separable cap may be utilized on any mug or vessel having a comparable inside diameter and attaching threads. The instant invention is presently compatible with Timolino Ltd. Tazza Vacuum Mugs Series VMM-35 or other similar dual layer stainless steel vacuum containers.

Yet another object of the invention provides the capability to function as a sipper cup at any rotational angle permitting the brewed liquid to be consumed from any side without limitations as the flow path remains universal.

A further object of the invention is that the filter perforation holes are small enough to limit even the diminutive debris from the beverage media remaining suspended in the brewed beverage.

Finally dead air spaces remain in both the cap and plug providing insulation retaining the desired temperature control of a double wall vacuum mug.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is isometric view of the separable cap in the preferred embodiment.

FIG. 2 is a top view of the separable cap in the preferred embodiment.

FIG. 3 is a side view of the separable cap in preferred embodiment.

FIG. 4 is a cross sectional view taken along lines 4-4 of FIG. 2.

FIG. 5 is a bottom view of the separable cap in the preferred embodiment.

FIG. 7 is isometric view of the removable lid in the preferred embodiment.

FIG. 8 is a top view of the removable lid in the preferred embodiment.

FIG. 9 is a side view of the removable lid in preferred embodiment.

FIG. 10 is a cross sectional view taken along lines 10-10 of FIG. 8.

FIG. 11 is a bottom view of the removable lid in the preferred embodiment.

FIG. 12 is isometric view of the diaphragm plug in the preferred embodiment.

FIG. 13 is a top view of the diaphragm plug in the preferred embodiment.

FIG. 14 is a side view of the diaphragm plug in preferred embodiment.

FIG. 15 is a cross sectional view taken along lines 15-15 of FIG. 13.

FIG. 16 is a bottom view of the diaphragm plug in the preferred embodiment.

FIG. 17 is isometric view of the stopper body in the preferred embodiment.

FIG. 18 is a top view of the stopper body in the preferred embodiment.

FIG. 19 is a side view of the stopper body in preferred embodiment.

FIG. 20 is a cross sectional view taken along lines 20-20 of FIG. 18.

FIG. 21 is a bottom view of the stopper body in the preferred embodiment.

BEST MODE FOR CARRYING OUT THE INVENTION

Figure 6:
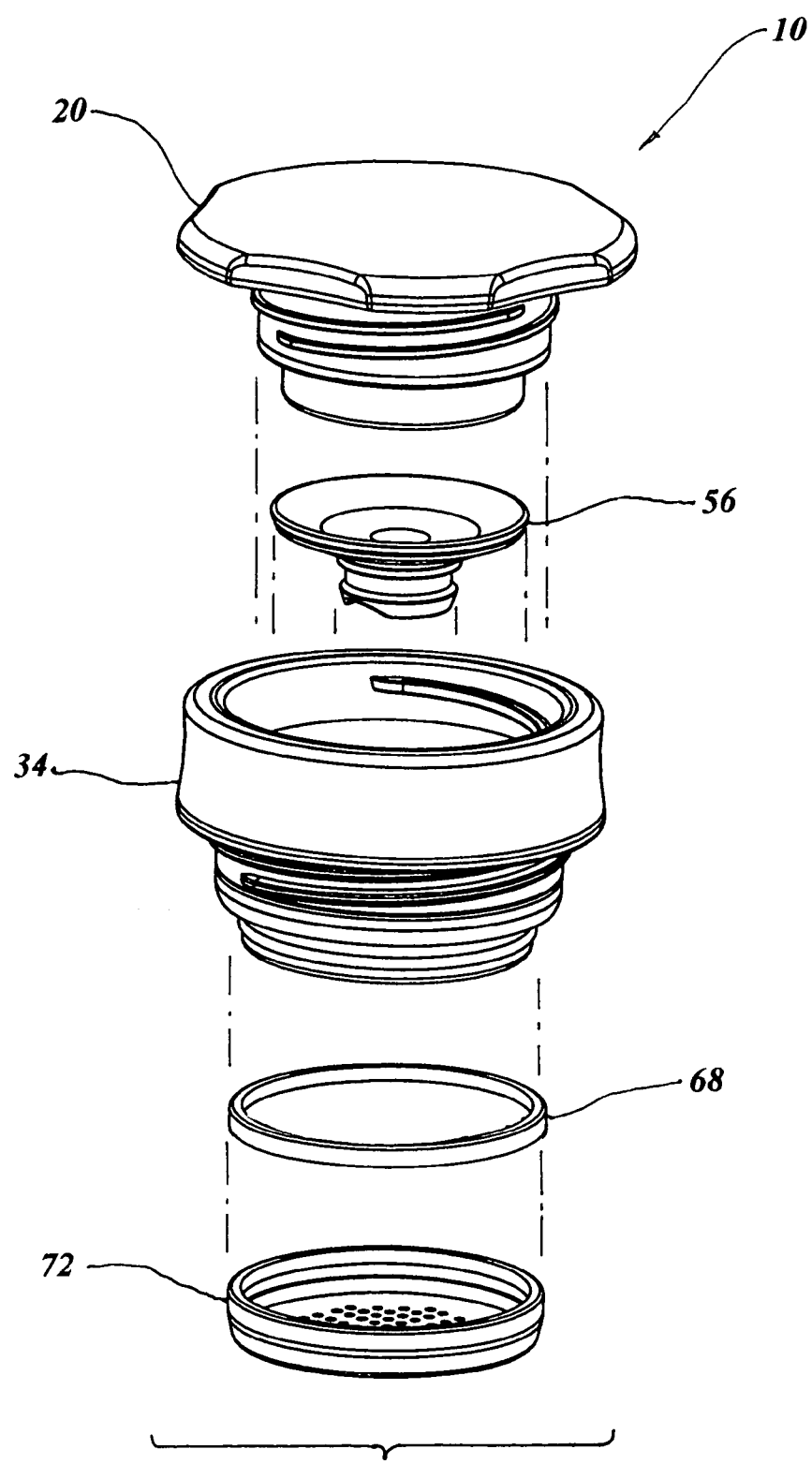
FIG. 6 is exploded view of the separable cap in the preferred embodiment.

The best mode for carrying out the invention is presented in terms of a preferred embodiment of a separable cap 10 for a vacuum mug. This preferred embodiment is shown in FIGS. 1 thorough 21 and is comprised of a removable lid 20 having a graspable shaped outwardly extending lip 22 which includes a plurality of finger gripping protrusions 24 that form the graspable shape, illustrated best in FIGS. 1-11.

The lid 20 includes integral stopper attachment means in the form of external threads 26, as depicted in FIGS. 3, 4, 9 and 10. The lid 20 is fabricated in two separate pieces and bonded together to form a integral discrete part, as shown in the cross section of FIG. 10. A lid top member 28 of the lid 20 is permanently attached to a diaphragm depressor member 30 and is positioned opposite the graspable shaped outwardly extending lip 22. A dead air space 32 is formed between lid top member 28 and the diaphragm depressor member 30, which functions as insulation between contents of the mug and the surrounding ambient environs.

A stopper body 34, illustrated in FIGS. 18-21, includes a bottom portion 36 having a central orifice 38 therein, with the body attached with body internal threads 40 to the removable lid external threads 26. The stopper body 34 may be described as having an upper body portion 42 and a lower body portion 44, with the lower portion 44 configured to fit inside the vacuum mug. The stopper body 34 is attached with the body internal threads 40 mating with the removable lid external threads 26.

The stopper body 34 preferably utilizes an outwardly extending skirt 46 attached integrally to the stopper body upper portion 42. The skirt 46 surrounds the body member upper portion 42 and includes a smooth radial top edge 48 for sipping, with the entire skirt 46 having a configuration that assures ease of griping. As illustrated in FIGS. 19 and 20, the stopper body upper portion 42 includes external threads 50 for attachment to the vacuum bottle. The body lower portion 44 includes a dished bottom 52 surrounding the central orifice 38 and along with a number of thru openings 54, preferably slots, positioned adjacent to the central orifice 38 shown pictorially in FIGS. 18 and 21.

A resilient diaphragm plug 56, depicted in FIGS. 13-16, is compressed between the lid 20 and the stopper body 34 with a plug portion 58 penetrating the central orifice 38 creating a liquid tight seal. The diaphragm plug has a mushroom shape with dished top 60 and a lip 62 on a stem portion 64, illustrated best in FIGS. 12, 14 and 15. A dead air space dead air space 66 is formed between the dished top 60 and the stem portion 64, as shown in FIG. 15, with the entire diaphragm plug 56 preferably fabricated of silicone material.

The resilient diaphragm plug 56 functions as a gasket to seal the liquid interior contents of the vacuum mug when the lid 20 is attached to the stopper body 34. When threadably attaching the lid 20 onto the stopper body 34, by manual rotation of the stopper body 34 on the lid 20, the dished top 60 is engaged by the diaphragm depressor 30 and conforms to the shape of the dished bottom 52. Compression created by the lid 20 onto the stopper body 34 permits the dished top 60 to cover all of the thru openings 54 simultaneously. When the lid 20 is removed the plug dished top 60 is released returning to its original at rest condition allowing a clear passageway for liquid to flow from the mug.

A stopper mug seal 68, illustrated in FIGS. 3, 4 and 6, is attached to the stopper body 34 providing a liquid tight seal between the cap 10 and the vacuum mug. The stopper mug seal 68 is formed of a resilient material, well known in the art, and is contained in a seal groove 70 within the body lower portion 44 as shown in FIGS. 19 and 20.

A beverage filter 72, preferably of silicone material, incorporates a quantity of perforated holes 74 small enough to block beverage media residue. The filter 72 is snapped over a filter bead 76 integrally formed in the body lower portion 44, as depicted in FIG. 20. The basic configuration, along with the resilient nature of the material of the filter 72, permits easy removal for cleaning or replacement.

The lid 20 and stopper body 34 are formed of thermoplastic resin such as cellulose, phenolic, phenylene oxide, polycarbonate, polyester, polyethylene, polypropylene, polystyrene, acetyl, and polyimide or poly vinyl chloride.

The functional operation of the vacuum mug separable cap 10 permits beverage media, such as coffee grounds or tea leaves to be placed into the vacuum mug and hot water poured over the media, after steeping, a brewed beverage is formed. When the lid is removed the compressed diaphragm plug 56 is released permitting the beverage to be sipped from the stopper body 34 and the media residue is strained with the filter 72.

The five discrete parts of the cap 10, as shown in the exploded view of FIG. 6, are easily dissembled and assembled for cleaning as their function is intuitively understood.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A separable cap for a vacuum mug which comprises:
    a removable lid having a graspable shaped outwardly extending lip and said lid having integral stopper attachment means, said removable lid further comprises a lid top member and a diaphragm depressor member attached integrally to the lid top member opposite the graspable shaped outwardly extending lip,
    a stopper body, having a bottom portion including a central orifice, wherein the body is attached to the removable lid utilizing the lid integral stopper attachment means,
    a resilient diaphragm plug compressed between the lid and the stopper body with a plug portion penetrating the central orifice in a liquid tight manner,
    a stopper mug seal attached to the stopper body providing a liquid tight seal between the cap and the vacuum mug, and
    a beverage filter removeably attached to the stopper body bottom portion permitting a beverage media to be placed into the vacuum mug and hot water poured over the media, after steeping, a brewed beverage is formed, when the lid is removed the compressed diaphragm plug is released and returns to its original at rest dished shape permitting the beverage to be sipped from the stopper body and the media residue strained with the filter.

2. The separable cap for a vacuum mug as recited in claim 1 wherein said removable lid graspable shaped outwardly extending lip further comprise a plurality of finger gripping protrusions forming the graspable shape.

3. The separable cap for a vacuum mug as recited in claim 1 wherein said diaphragm depressor member is attached integrally to the lid top member and is positioned opposite the graspable shaped outwardly extending lip, wherein between said lid top member and said diaphragm depressor member a dead air space is formed, acting as insulation between contents of a mug and surrounding ambient environs.

4. The separable cap for a vacuum mug as recited in claim 1 wherein said stopper body further comprises a body member having an upper body portion and a lower body portion with the lower portion configured to fit inside the vacuum mug.

5. The separable cap for a vacuum mug as recited in claim 4 wherein said stopper body further comprises an outwardly extending skirt attached integrally to the stopper body upper portion, wherein the skirt surrounds the body member upper portion and includes a smooth radial top edge for sipping with the entire skirt having a configuration that provides griping ease.

6. The separable cap for a vacuum mug as recited in claim 4 wherein said stopper body upper body portion further comprises body internal threads for attaching to said lid integral stopper attachment means.

7. The separable cap for a vacuum mug as recited in claim 4 wherein said stopper body upper body portion further comprises external threads for attachment to the vacuum bottle.

8. The separable cap for a vacuum mug as recited in claim 4 wherein said stopper body lower body portion further comprises a dished bottom surrounding the central orifice.

9. The separable cap for a vacuum mug as recited in claim 8 wherein said stopper body lower body portion surrounding the central orifice having a plurality of thru openings adjacent to the central orifice.

10. The separable cap for a vacuum mug as recited in claim 1 wherein said resilient diaphragm plug having a mushroom shape with dished top and a stem portion including a lip thereon.

11. The separable cap for a vacuum mug as recited in claim 10 wherein said resilient diaphragm plug having a dead air space between said dished top and said stem portion.

12. The separable cap for a vacuum mug as recited in claim 1 wherein said resilient diaphragm plug is silicone material.

13. The separable cap for a vacuum mug as recited in claim 1 wherein said stopper mug seal is resilient.

14. The separable cap for a vacuum mug as recited in claim 1 wherein said beverage filter is silicone material.

15. The separable cap for a vacuum mug as recited in claim 1 wherein said lid and stopper body are formed of thermoplastic resin selected from the group consisting of cellulose, phenolic, phenylene oxide, polycarbonate, polyester, polyethylene, polypropylene, polystyrene, acetyl, polyimide and poly vinyl chloride.

* * * * *